(No Model.) 2 Sheets—Sheet 1.

J. M. DODDRIDGE.
HARVESTING MACHINE.

No. 565,883. Patented Aug. 18, 1896.

Witnesses.
Joseph P Iliff
Lewis E. Iliff

Inventor.
James M Doddridge
by W J Dennis
Attorney (No Model.)
2 Sheets—Sheet 2.

J. M. DODDRIDGE.
HARVESTING MACHINE.

No. 565,883.
Patented Aug. 18, 1896.

Witnesses.
Joseph P Iliff
Lewis E. Iliff

Inventor.
James M Doddridge
by W. J Dennis
Attorney

UNITED STATES PATENT OFFICE.

JAMES M. DODDRIDGE, OF MILTON, INDIANA.

HARVESTING-MACHINE.

SPECIFICATION forming part of Letters Patent No. 565,883, dated August 18, 1896.

Application filed May 18, 1892. Serial No. 433,400. (No model.)

*To all whom it may concern:*

Be it known that I, JAMES M. DODDRIDGE, a citizen of the United States, residing at Milton, in the county of Wayne and State of Indiana, have invented certain new and useful Improvements in Harvesting-Machines; and I do hereby declare the following to be a full, clear, and exact description of the invention, such as will enable others skilled in the art to which it appertains to make and use the same.

My invention relates to attachments for center and side cut mowers for windrowing clover and other grain.

My invention consists principally of a slatted platform, the slats being secured to a cross-head at their front ends and nearer together at their rear than at their front ends, the head being hinged to the finger-bar of a mower, while the rear end of the platform drags on the ground while receiving and discharging its grain-bunches, and remains in this position while in operation, only being raised off the ground when backing the team or turning at the end of the swath.

It consists also in other features particularly described hereinafter.

Figure 1:
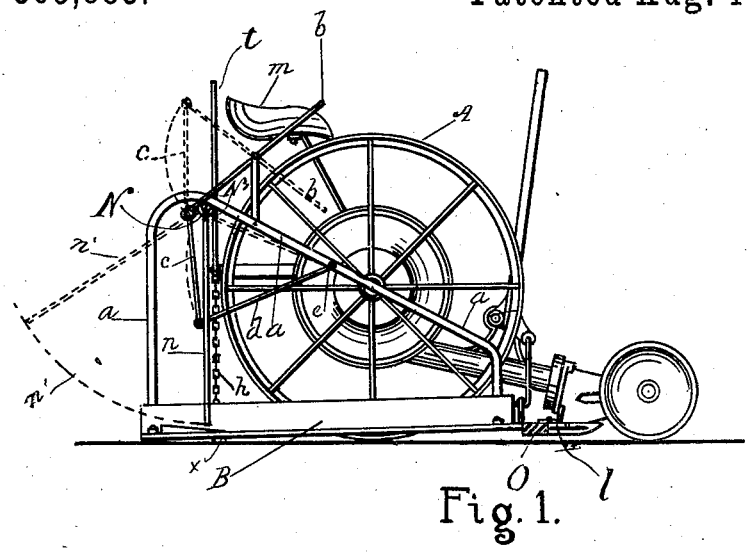
Figure 2:
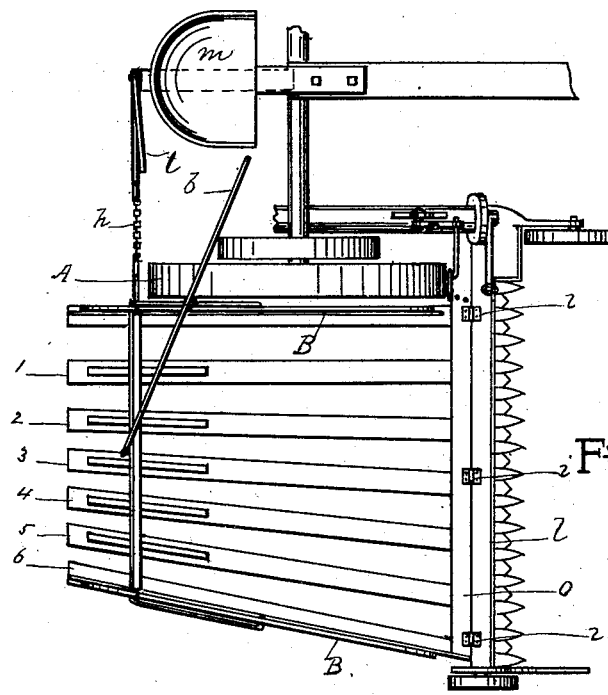
Figure 3:
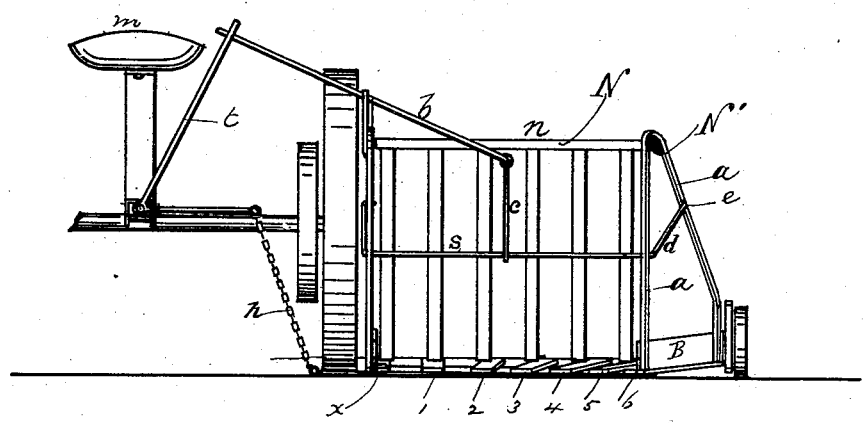

In the drawings, Figure 1 is a side elevation of my improvement attached to the driving-wheels and finger-bar of a mower as usually constructed. Fig. 2 is a top plan view of same. Fig. 3 is a rear elevation showing the stop or gate in position.

The finger-bar of the mower being up off the ground and the cross-head of the attachment attached thereto, with the rear end of attachment upon the ground, the platform is thereby given a downward inclination from front to rear. This allows the reel to be dispensed with in cutting clover, flax, and similar grain, they being stiff and bushy enough to force their way back over the head-piece of the attachment, where the slats are of sufficient distance apart to allow the grain to lie upon the stubble, which protrudes up between the slats, without carrying or dragging the grain along as the team moves forward. The slats, being thin, pass into the stubble and under the cut grain without molesting it until the grain has reached the rear end of platform and is stopped by the gate *n* (shown in Fig. 3 of drawings) until the desired amount has accumulated, when the lever *b* may be brought down, raising the brace-bar *s* crossing the gate's center, (which brace-bar is the only support to prevent the gate *n* from swinging back.) The bunch that has accumulated forces the gate back by the pressure of the stubble, which protrudes up between the slats which hold the grain, and allows the platform to pass out from under and delivers the grain in uniform bunches upon the ground, as by a hay-rake, and ready for placing upon wagons without further handling.

An important feature consists in the slats being long enough to allow the desired amount of grain to accumulate at the rear end of the platform and still leave space at all times for the grain that is being forced back over the head-piece of the attachment as it is being cut by the sickle, allowing it to continue to force its way back without clogging the sickle by coming in contact with the bunch that has accumulated.

A further feature consists of a device for raising the rear end of the platform from one side, as shown in Fig. 3, by means of the lever *t* and chain *h*, the connecting-bar *x* being of sufficient weight and stiffness to raise the slats without allowing them to sag down on the opposite side from point of attachment of the chain *h*. This construction is used when turning at the end of a swath or backing the machine, and prevents the slats from catching on obstructions and running into the ground while the team is being backed.

A further feature consists in arranging the slats of the platform at different angles to the head-piece, so that the rear ends of the slats are nearer each other than they are at the front end where connected to the head-piece O, as shown in Figs. 2 and 3 of the drawings.

Another feature of importance is the raised side-boards B B. (Shown in Figs. 2 and 3.) These side-boards are attached to the two outside slats and prevent seed from wasting or becoming lost from the platform by the pressure of the stubble from the outside of the platform. By the connection of the side-boards to the converging slats the platform is allowed to move along under the cut grain and press the grain into a narrower space as it passes back to the rear end than the swath being cut by the sickle, thus leaving room for the team to walk and the ground-wheels of the mower to pass without disturbing the grain-bunches in cutting the succeeding swath.

The side-boards or shields and converging slats form an important feature in the working of my platform. By bringing the slats nearer together at their rear ends it lessens the space for the stubble to protrude, the pressure of the stubble upon the grain that has accumulated upon the rear end of the platform is lessened, and the side-boards forcing a greater weight of grain upon a less space than has been cut by the sickle helps to resist the power of the stubble, so that when the grain comes in contact with the gate or stop it does not roll or pile up as when gathered by an ordinary hay-rake, but remains at rest on the rear end of the platform with the heads all up and standing the same height as the uncut grain. When the gate $n$ is released and the platform is allowed to draw itself out from under the grain, as the team moves forward, the grain is left standing upon the ground with the heads up as if shocked, which gives the seed the advantage of sun and wind and prepares it for threshing sooner than if windrowed by any other known method.

A frame $a\ a\ a$ is secured on each side of the slatted platform, which serves as a support for a hand-lever $b$, one end of said lever being pivoted to a connecting-rod $c$. Hinged arms $d$ are pivoted to the frames $a$ at $e$. The arms $d$ are connected by a rod $s$, to the middle of which the connecting-rod $c$ is attached. The rod $s$ when forced downward braces the gate $n$ against the pressure of the grain on the platform. The platform upon which the grain falls when cut is composed of longitudinal slats 1 2 3 4 5 6, (or as many as are practical, a different number being required for mowers having different widths of cut,) secured to a cross-head $o$ at their front ends. In the arrangement of these slats they are set at different angles, so that their rear ends are nearer together than their front ends and at such angles as will throw the bunch the most out of the way in cutting the succeeding swath, the angles being different on different mowers, according to their construction.

Raised side-boards B B are secured to the side of the slatted platform. (Best shown in Figs. 1 and 3.)

$n$ represents a gate or stop which has a vertical movement, and when at rest acts as a stop against which the cut grain accumulates.

The gate $n$ is composed of vertical slats secured to a cross-head N at the upper end. This cross-head N has its ends journaled in suitable supports N′, projecting from upper rear end of frame $a\ a\ a$, and serving as the means of pivotally connecting the gate with the said frames. The lever $b$ extends to a point within convenient reach of the operator sitting on seat $m$. The operator forces downward the free end of the lever $b$, which is linked to rod $c$, which rod $c$ is connected to the horizontal rod $s$, (the horizontal rod $s$ being the only support that gate $n$ has to retain the grain upon the platform,) thereby raising the rod $s$, and the gate $n$ is forced back by the grain that has accumulated upon the platform, as shown in dotted lines $n'\ n'$ in Fig. 1. When the platform has passed out from under the grain-bunch, the free end of the lever $b$ is brought up, driving the brace-rod down and forcing the gate $n$ into its former position.

The slatted platform is hinged to the finger-bar $l$ of a mower at $i\ i\ i$.

Having now described my invention, what I claim as new, and wish to secure by Letters Patent, is—

1. In a harvester, the combination of a slatted platform, adapted to be attached to the rear side of the finger-bar of a mower, having its slats set at different angles so that their rear ends are closer together than their front ends, substantially as described and set forth.

2. In a harvester, the combination of a slatted platform, adapted to be attached to the rear side of the finger-bar of a mower, having its slats set at different angles and provided with raised side-boards or shields attached to each side of platform, substantially as described.

3. In a harvester, the combination of a slatted platform having side-boards, a frame on each side and a gate hinged to the said frame, a brace-rod $s$ linked to said frame, a lever on one of the frames, and a connection between the lever and the said brace-rod, substantially as described.

In testimony whereof I affix my signature in presence of two witnesses.

JAMES M. DODDRIDGE.

Witnesses:
W. T. DENNIS,
G. W. CALLAWAY.